April 10, 1945. V. MANCINI 2,373,585

BOLT ANCHOR

Filed Aug. 13, 1943

INVENTOR.
VINCENZO MANCINI.
BY
ATTORNEY.

Patented Apr. 10, 1945

2,373,585

UNITED STATES PATENT OFFICE 2,373,585

BOLT ANCHOR

Vincenzo Mancini, New York, N. Y.

Application August 13, 1943, Serial No. 498,501

9 Claims. (Cl. 85—2.4)

This invention relates to bolt anchors and more particularly to the expansion type.

It is an object of the present invention to provide a very efficient, practical, economical and serviceable bolt anchor.

It is a further object of the present invention to provide a bolt anchor wherein a multiplicity of like parts or claws are held in relative positions by means of a band and which parts are capable of being radially expanded as a unit to grip the wall of an opening, a bolt-receiving member held captive within the unit being capable of securely locking a bolt to a desired wall or other object.

It is a further object of the present invention to provide a bolt anchor whereby the said bolt-receiving member in the form of a nut is normally held in extended position by an expansion spring.

It is a still further object of the present invention to provide seating means on the said similar parts for the said expansion spring.

It is yet another object of the present invention to provide the inner wall of the said respective cooperating parts with a flat face engageable with corresponding flat face of the nut member whereby to prevent the nut member from turning when the bolt is applied.

Another object of the present invention resides in providing the outer wall of each of the said like parts of the said unit with a plurality of "steps" to enhance the gripping quality of the unit in the opening in which it is inserted.

Further objects and advantages of the invention will appear from the following disclosure thereof, together with the attached drawing which illustrate a certain form of embodiment thereof. This form is shown for the purpose of illustrating the invention since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Figure 1:
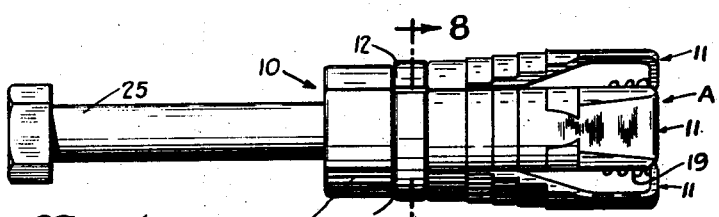
Fig. 1 is an elevational view of a bolt anchor made in accordance with the invention.
Figure 2:
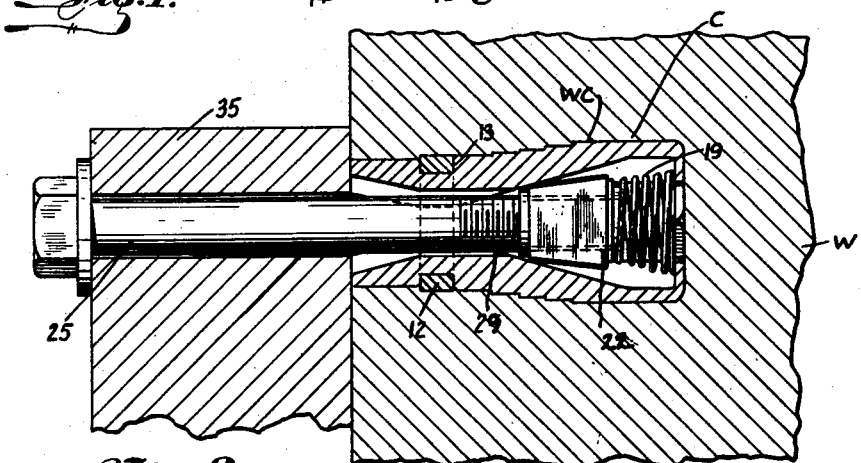
Fig. 2 illustrates the same bolt anchor shown in Fig. 1 in sectional view and applied to a wall.
Figure 3:
Fig. 3 illustrates a top view of one of the expansion members.
Figures 6, 7:
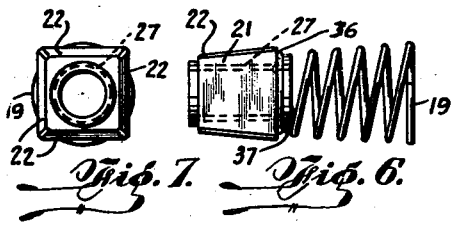
Fig. 6 is a side elevational view of the nut member with the expansion spring attached thereto.
Fig. 7 is a left-hand view of Fig. 6.
Figure 4:
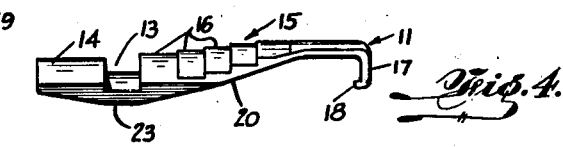
Fig. 4 is a side view of Fig. 3.
Figure 8:
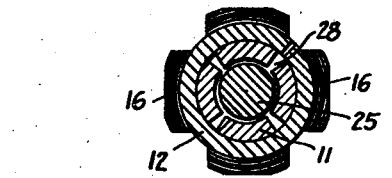
Fig. 8 is a cross-sectional view taken on line 8—8 of Fig. 1.
Figure 5:
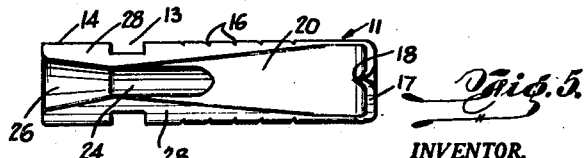
Fig. 5 is a bottom view of Fig. 4.

Referring now more particularly to the drawing, the bolt anchor generally indicated by the numeral 10 comprises a plurality of movable like expandable members 11 held together as a unit by ring or collar 12 seated in grooves 13 of the said members 11, the grooves 13 forming substantially an annulus when the said members are in assembled position. Each member 11 comprises an arcuate section 14 adjacent to groove 13 acting as a shoulder for the ring 12 seated in the groove 13. The outer wall 15 of member 11 on the other side of groove 13 constitutes a plurality of step-like rings 16 which act as gripping surfaces for the cavity in the wall W (illustrated in Fig. 2).

The extreme end of the outer wall 15 of each member 11 is bent laterally as at 17 and again bent inwardly as at 18 forming thereby a seat and a retaining hook for helical spring 19. The inner wall 20 of member 11 is preferably flat and inclined to form a sliding seat for the flat and inclined surface 21 of the nut 22 held captive within the unit when the members 11 are assembled. Flat surface 20 of member 11 inclines towards the ring-engaging end 23 so as to facilitate outward expansion of the end A of the bolt anchor 10 as upon the application of an outwardly directed force upon bolt 25 engaging nut 22.

In this instance, the ring 12 will act as an anchor or fulcrum from which the plurality of members 11 will move to either expand or contract the bolt anchor, such movement being greatest at the end A thereof. A groove 24 for clearing the bolt 25 is formed through the ring-engaging end 23 and communicates flat inclined surface 20 with tapered portion 26 forming a neck surrounding the bolt 25. The nut 21 is threaded as illustrated at 27 to receive the threaded portion 29 of the bolt 25.

Each member 11 preferably has its edges 28 bevelled so as to normally provide an uninterrupted substantially cylindrical surface when members 11 are combined by the ring 12 to form the bolt anchor.

The bolt anchor operates as follows:

A cavity C which may be tapered is provided in wall W in a conventional manner. The bolt anchor 10 is inserted into this cavity. The nut 21 is located in this instance as close toward the end A of the bolt anchor as possible, thus collapsing the end A of bolt anchor 10; and thereby, reducing the space between members 11 at the end A and the opening C. Bolt 25 is now inserted, say, through member 35 which is to be clamped to the wall W. The threaded portion 29 of bolt 25 engages nut 21 causing the flat surfaces 22 of nut 21 to ride along the flat surfaces 20 of clamping members or fingers 11, thus producing an expansion of members 11 which is greatest at the end A. Members 11 will firmly grip the surface WC of cavity C in the wall W. One end 36 of the spring 19 is secured to nut 21 for which purpose a groove is formed therein by providing a collar 37.

Spring 19 rests on seats 17 and is held against lateral movement by the stops 18.

Thus, in one of its specific aspects, the bolt anchor comprises the plurality of fingers 11 each having the outer substantially transverse arcuate groove 13 disposed adjacent an end thereof and inner substantially longitudinal recesses 24, 26, adjacent groove 13, collar or band 12 seatable in grooves 13, the fingers or members 11 being normally loosely held together as a unit 10 by engagement with collar 12 in grooves 13, nut 22 surrounded by fingers 11, the latter forming substantially a housing within which nut 22 is operable, recesses 24, 26, providing a passageway for the forward end of bolt 25 for engagement with nut 22 in the housing, fingers 11 having slanting substantially flat inner walls 20 extending in the direction of end A of the bolt anchor and the preferably unsmoothed outer surface or wall 15, nut 22 having inclined walls or faces 21 adapted for slidable engagement with slanting inner walls 20 whereby longitudinal movement of nut 22 in the housing will cause movement of fingers 11 for expansion and retraction of unit 10, respectively; fingers 11 being preferably substantially hooked at end A; and helical spring 19 being secured to one end of nut 22 and engageable with the hooked ends 18, 17 of fingers 11.

Having thus described the invention, what I claim as new, and desired to secure by Letters Patent, is:

1. A bolt anchor or the like comprising a plurality of fingers, each of said fingers having an outer substantially transverse arcuate groove disposed adjacent one end thereof and an inner substantially longitudinal recess adjacent said groove, a collar seatable in said grooves, said fingers being normally loosely held together as a unit by engagement with said collar in said grooves, a nut, said fingers surrounding said nut and forming substantially a housing within which said nut is operable, said recesses providing a passageway for the forward end of a bolt for engagement with said nut in said housing, each of said fingers having a slanting substantially flat inner wall extending in the direction of the other end therof and an unsmoothed outer surface, said nut having inclined faces adapted for slidable engagement with said slanting inner walls whereby longitudinal movement of said nut in said housing will cause movement of said fingers, providing expansion and retraction of said unit, respectively, said fingers being substantially hooked at their said other ends, and a helical spring secured to one end of said nut and engageable with said hooked ends of said fingers.

2. A bolt anchor or the like comprising a plurality of fingers, each of said fingers having an outer substantially transverse arcuate groove disposed adjacent one end thereof and a substantially arcuate inner wall at said one end, a collar seatable in said grooves, said fingers being normally loosely held together as a unit by engagement with said collar in said grooves, a nut, said fingers surrounding said nut and forming substantially a housing within which said nut is operable, said arcuate inner walls providing a passageway for the forward end of a bolt for engagement with said nut in said housing, each of said fingers having a slanting substantially flat inner wall extending in the direction of the other end thereof, said nut having walls adapted for slidable engagement with said slanting walls whereby longitudinal movement of said nut in said housing will cause movement of said fingers providing expansion and retraction of said unit, respectively, said fingers being substantially hooked at their said other ends, and a helical spring secured to one end of said nut and engageable with said hooked ends of said fingers.

3. A bolt anchor or the like comprising a plurality of fingers, each of said fingers having a recess at one end, a band normally loosely holding together said fingers providing a unit, a nut, said fingers surrounding said nut and forming substantially a housing within which said nut is operable, said recesses providing a passageway for the forward end of a bolt for engagement with said nut in said housing, at least some of said fingers having each a slanting inner wall extending in the direction of the other end of said fingers, said nut having walls adapted for slidable engagement with said slanting walls, at least some of said fingers being substantially hooked at their said other ends, and a helical spring within said housing and seatable on said hooked ends of said fingers.

4. A bolt anchor or the like comprising a plurality of fingers, each of said fingers having a substantially arcuate inner section at one end, a band normally loosely holding together said fingers providing a unit, a nut, said fingers surrounding said nut and forming substantially a housing within which said nut is operable, said arcuate inner sections providing a passageway for the forward end of a bolt for engagement with said nut in said housing, said fingers and said nut having relatively slanting engageable walls whereby longitudinal movement of said nut in said housing will cause movement of said fingers providing expansion and retraction of said unit, respectively, at least some of said fingers being substantially hooked at their other ends, and a helical spring within said housing and seatable on said hooked ends of said fingers.

5. A bolt anchor or the like comprising a plurality of fingers, a band normally loosely holding together said fingers providing a unit, a hollow element, said fingers surrounding said element and forming substantially a housing within which said element is operable, said fingers and said element having relatively slanting engageable walls whereby longitudinal movement of said element in said housing will cause movement of said fingers providing expansion and retraction of said unit respectively, and a helical spring within said housing and engaging said element.

6. A bolt anchor or the like comprising a plurality of fingers, a band normally loosely holding together said fingers providing a unit, a hollow element, said fingers surrounding said element and forming substantially a housing within which said element is operable, said fingers and said element having relatively slanting engageable walls whereby longitudinal movement of said element in said housing will cause movement of said fingers providing expansion and retraction of said unit respectively, a helical spring within said housing and engaging said element, and a stop on said unit for said spring.

7. A bolt anchor or the like comprising a plurality of members, means normally loosely holding together said members providing substantially a housing, a hollow element operable within said housing, said members and said element having relatively slanting engageable walls whereby longitudinal movement of said element in said housing will cause movement of said members providing expansion and retraction of said housing, respectively, and a helical spring within said housing and engaging said element.

8. A bolt anchor or the like comprising a plurality of members, means normally loosely holding together said members providing substantially a housing, a hollow element operable within said housing, cooperable means on said members and said element for causing expansion and retraction, respectively of said housing when said element is moved longitudinally in said housing and resilient means within said housing and engaging said element.

9. A bolt anchor or the like comprising a plurality of members, means normally loosely holding together said members providing substantially a housing, a hollow element operable within said housing, cooperable means on said members and said element for causing expansion and retraction, respectively of said housing when said element is moved longitudinally in said housing, and a helical spring within said housing and engaging said element.

VINCENZO MANCINI.